Patented Aug. 13, 1940

2,211,678

UNITED STATES PATENT OFFICE 2,211,678

FRESH INGREDIENT BASE FOR FOOD PRODUCTS

William R. Voss, Milwaukee, Wis.

No Drawing. Application June 5, 1939, Serial No. 277,493

2 Claims. (Cl. 99—92)

The present invention relates to improvements in an intermediate food product and method of making the same for use in connection with the making of baked goods, frostings, icings, fillings, custards, dressings, candies and other food products having as a base some or all of the following: fresh eggs (whites, yolks or whole eggs) or other protein colloid, milk, butter, chocolate, cocoa, fats of various kinds and sugar or other soluble carbohydrate.

It is considered that the present application is a continuation-in-part of my application Serial No. 145,513, filed May 29th, 1937; being a more complete and detailed disclosure of certain aspects of the intermediate food products and method of making the same, therein disclosed.

The present invention has for its primary object the provision of an article of manufacture in the form of an intermediate food product which makes available for future use, without refrigeration, such fresh ingredients as eggs (whites, yolks or whole eggs) or other protein colloid, whole or skimmed milk, butter and other fats and shortening, easily transportable and conveniently associated for commercial and domestic use.

More specifically, another object of the invention is to provide an intermediate food product, and method of making the same for use in making baked goods and other food products having similar fresh ingredient bases consisting of the usual fresh ingredients and sugar homogenized so as to render it stable and permanently keeping under ordinary climatic conditions.

A further object is to provide, as an article of manufacture, an intermediate food product of such fresh ingredients as eggs, milk, butter, fats and other shortenings rendered imputrescible by the addition of sugar and homogenization.

A still further object of the invention is to provide a food product for use as an intermediary product in the manufacture of baked goods consisting of eggs, milk and shortening dispersed in a highly emulsified condition in an aqueous sugar solution and thus rendered stable and permanently keeping.

A still further object is to provide as an article of manufacture for shipment in the ordinary channels of trade, a cold preserved moist composition of the non-farinaceous ingredients of cake batter, sweet dough and the like which consists of a heterogeneous mixture having that high degree of subdivision and dispersion of the non-miscible ingredients thereof characteristic of homogenized materials and comprising water, fat, uncoagulated protein colloid, and sugar or soluble carbohydrate in solution in preserving concentration and in sufficiently intimate contact with the remaining ingredients to render its preserving action effective.

In the making of food products, both commercially and in the home, the association and mixing of the so-called fresh ingredients such as eggs, milk, butter, fat and other shortening, requires considerable skill and the consumption of much time. In addition, the problem of storage and refrigeration of these fresh ingredients is always present. This is particularly true in the case of the commercial baker. Also, for the reason that dehydrated ingredients do not give the result desired, and that fresh ingredients must be used for a quality product, it has been impractical to purchase for extended future use the fresh ingredients at periods when the market is most favorable.

At the present time the large bakeries receive their requirements of fresh eggs from refrigerated storage into which they have been placed by egg breaking plants. This requires refrigeration unless the eggs are to be thawed out and immediately used as does whole and skimmed milk, butter and certain other shortening. In most cases the eggs, milk and shortening are all separately purchased, handled and stored prior to being associated into the baked goods product.

Under present practices, in order for a commercial bakery or a house wife to make a devil food cake under the formula of the American Bakers Association, it is necessary that ten different ingredients be kept in stock, each of which must be measured or weighed, and requires approximately thirty minutes for association and mixing. This is in contrast to the practice under the present invention in which a new article of manufacture is provided in which several of the ingredients are combined into a single mix which is stable and permanently keeping under ordinary climatic conditions. In this way the baker needs only stock four ingredients, at the most, including the proposed liquid mix, only four ingredients need be measured or weighed, and the time required for association and mixing is reduced to approximately four minutes.

Generally stated, the present invention relates to a liquid mix as a new article of manufacture for use as a base in the making of baked goods, frostings, icings, candies, etc. The advantages of the invention are best realized in the case where the liquid mix is packaged in standard containers at a central mixing plant and then distributed through the regular channels of trade, without refrigeration. By locating the mixing plants in dairy and poultry areas the fresh ingredients may be obtained to an advantage to the ultimate consumer with the added advantage to the consumer of being able to buy many months' supply during that period of the year when dairy and poultry products are the most plentiful and at a low price. This future supply can be stored without refrigeration and the container opened and the contents removed as needed without spoilage.

My improved liquid mix as an intermediate food product can perhaps be best understood by reference to certain typical formulas developed for baked goods:

Yellow Cake

The liquid mix:
- 140# Granulated sugar
- 3# 12 oz. salt
- 105# Liquid skimmed milk
- 55# High ratio shortening
- 60# Whole eggs Added by the baker:
- 100# High ratio sugar bearing flour
- 6# Baking powder

White Cake

The liquid mix:
- 140# Granulated sugar
- 3# 12 oz. salt
- 95# Liquid skimmed milk
- 55# High ratio shortening
- 75# Egg whites
- 4½ Ounces lecithin Added by the baker:
- 100# High ratio sugar bearing flour
- 6# 4 oz. baking powder

Medium Dark Devil Food Cake

The liquid mix:
- 140# Granulated sugar
- 3# 12 oz. salt
- 20# Dutch cocoa
- 130# Liquid skimmed milk
- 55# High ratio shortening
- 75# Egg whites
- 4½ Ounces lecithin Added by the baker:
- 100# High ratio sugar bearing flour
- 3# 4 oz. baking powder
- 1# 14 oz. soda

Dark Devil Food Cake

The liquid mix:
- 175# Granulated sugar
- 4# 11 oz. salt
- 25# Cocoa
- 156# 4 oz. liquid skimmed milk
- 68# 12 oz. high ratio shortening
- 93# 12 oz. whole eggs Added by the baker:
- 100# High ratio sugar bearing flour
- 4# 11 oz. baking powder
- 1# 9 oz. soda
- 12 Ounces cinnamon In the making of icings and frostings, to one pound of the liquid mix for white cakes, the following are added to obtain a soft, yet firm setting frosting:

- 2# Confectionary sugar
- ¾ Teaspoon of vanilla
- Pinch of salt
- ¾ Tablespoon of gelatine stabilizer Any of the aforesaid liquid mixes may be similarly employed for the making of frosting. Moreover, liquid mix bases of the aforesaid types may all be used as bases for fudge, nougats, marshmallows, fondants and similar candies. While exceptions may come to light, it now appears that liquid mixes according to the present invention may be successfully used in the making of all food products in which sugar, fats, lard, butter, shortening, eggs, milk or other liquid form the principal base ingredients.

The manufacture and marketing of my liquid mix as a new article of manufacture does not necessitate the development of any new equipment or packaging. The ingredients in their desired proportion are placed together and brought up to a fluidized temperature which for the most part will be determined by the melting point of the fatty ingredient present and the viscosity of the sugar solution that may conveniently be handled in the mixing equipment. The mix may be heated to a fluidizing temperature in pasteurizing equipment now being used in dairies and ice cream plants. While any pasteurizing effect is merely incidental insofar as the keeping properties of the mix are concerned, the fluidizing temperature may be within the pasteurized range, namely, from 130° to 160°. Although it is generally considered that egg whites commence to coagulate at approximately 120° F. in the presence of the aqueous sugar solution coagulation does not appear to take place to any appreciable amount even when the temperature of the mix is raised to 160° F. Except as may be dictated by economical and practical processing of the mix in homogenizer equipment, fluidizing temperatures of 85° F. to 110° F. are sufficient to melt the fatty ingredients and enable uniform commingling of the sugar, liquid, eggs and fatty ingredients.

In making available an intermediate food product containing such ingredients as fresh eggs, whole or skimmed milk, butter, lard and other shortening which may be permanently kept under ordinary climatic conditions, it is my present theory that I have been able to accomplish this through the homogenization of these ingredients in the presence of an aqueous sugar solution of preserving concentration. At this point, it might be well to state that throughout the specification and claims the term "homogenization" is intended to describe that extremely fine state of subdivision which results from the use of apparatus commercially known as homogenizer, colloid mill, and other types of mechanical emulsifying equipment capable of reducing fat globules to a diameter in the order of 1 to 2 microns, which is several hundred times as small in bulk as normal milk butter fat particles. Subdivision of this character also appears to modify the coagulation stability of protein colloids and enhances the flocculation tendency thereof, indicating that marked changes in fine structure accompany such treatment. I do not insist on the accuracy of this theory.

A possible explanation of the keeping qualities of my improved liquid mix and the preservation of the characteristic properties of the fresh ingredients may be that bacterial colonization is disrupted and the protective membranes thereof shattered in the presence of the high sugar concentration and in this way localized areas of low sugar concentration favorable to bacterial decomposition are eliminated. In a like manner any membrane-like protective structures existing in the fats or proteins providing localized areas of low sugar concentration serviceable for bacterial refuges are disrupted. This makes possible the preserving effect of the sugar without resorting to sterilizing temperatures, which are out of the question because the egg colloids would be coagulated thereby. I am, of course, not positive as to this, it being more or less hypothetical.

In contrast to the preparations based upon dehydrated fresh ingredients, the preserved fresh ingredients in the liquid mix herein described not only retain all characteristic properties with reference to their conventional use in the preparation of food products, but the use thereof also makes it possible for unskilled persons to obtain improved uniform results. For example, in a laboratory test conducted under exacting conditions, it was found that cakes made from the homogenized liquid mix, when compared with similar cakes made according to standard practice, presented the following advantages:

(a) Permits the manufacture by the commercial baker of cakes of high quality home type cake baking.

(b) Cake baking is simplified and made practically foolproof. Only flour and baking powder need to be added to liquid fresh ingredients cake mixture.

(c) Mixing time is definitely cut down from 60 to 80 per cent, which, of course, constitutes a tremendous amount of labor and time saving.

(d) The cakes are more tender; yet not fragile.

(e) The cakes dissolve easier in the mouth.

(f) There is definitely a better taste sensation.

(g) Moistness and softness of crumb is achieved without sogginess.

(h) Better volume than ordinary cakes.

(i) Better grain and texture.

(j) Better keeping quality.

(k) Better all-around eating quality.

For convenience of description the terms "homogenized" and "homogenization," as used in the specification and claims, are used in a broad sense and are intended to include all mechanical processes and apparatus capable of particle subdivision of a substance to a degree accomplishing the results of the present invention. In the annexed article claims the term "homogenized" is also used to describe a subdivision of particles of the character described without reference to apparatus or process. In certain claims my improved article is described as a cold preserved composition. This is intended to distinguish the same from a composition which in its preservation has been subjected to sterilizing temperatures.

The sugar content will vary with the particular use of the liquid mix. Generally speaking, the sugar will constitute from thirty to sixty per cent by weight of the total liquid mix.

Throughout the specification and claims the terms soluble carbohydrates and sugar are intended to include soluble carbohydrates of the general class of sugars, such as sucrose, maltose, glucose, fructose, lactose, and their equivalents.

Having thus described my invention, what I desire to secure by Letters Patent and claim is:

1. A cold preserved moist composition of the nonfarinaceous ingredients of food products of the type described, which consists of a heterogeneous mixture having that high degree of subdivision and dispersion of the nonmiscible ingredients thereof characteristic of homogenized materials and comprising milk, shortening including butter-fat in particles of the order of magnitude of 1 to 2 microns in diameter, uncoagulated egg colloids, and sugar in solution in concentrations of from thirty to sixty per cent in sufficiently intimate contact with the remaining ingredients to render the preserving action thereof effective.

2. A method of cold preserving of a moist composition of such fresh ingredients as eggs, milk and shortening to provide an intermediate food product of permanent keeping qualities without refrigeration, comprising the steps of mixing said ingredients in an aqueous sugar solution of preserving concentration, maintaining the temperature of the composition below a sterilizing temperature to prevent coagulation of the protein colloid and subjecting the entire composition to a mechanical subdivision of sufficient degree that the shortening is dispersed in particles of magnitude in the order of 1 to 2 microns in diameter, whereby the ingredients are brought into sufficiently intimate contact with the sugar solution as to render its preserving action effective.

WILLIAM R. VOSS.